United States Patent [19]

Schuppiser et al.

[11] Patent Number: 5,066,508

[45] Date of Patent: Nov. 19, 1991

[54] HOMOGENEOUS, STORAGE-STABLE CHOCOLATE MILK COMESTIBLES AND PROCESS OF MAKING

[75] Inventors: Jean-Luc Schuppiser, Claye Souilly; Antoine Coutant, Paris; Jean-Claude Bozetto, Chilly Mazarin, all of France

[73] Assignee: Rhone-Poulenc Chimie, Courbevoie, France

[21] Appl. No.: 465,647

[22] Filed: Jan. 22, 1990

Related U.S. Application Data

[63] Continuation of Ser. No. 90,502, Aug. 28, 1987.

[30] Foreign Application Priority Data

Aug. 28, 1986 [FR] France .................. 86/12153

[51] Int. Cl.$^5$ .............................. A23C 9/156
[52] U.S. Cl. .................. 426/584; 426/573
[58] Field of Search .................. 426/584, 573

[56] References Cited

U.S. PATENT DOCUMENTS

| | | | |
|---|---|---|---|
| 1,989,758 | 1/1933 | Linn | 426/584 |
| 4,219,583 | 8/1980 | Igoe | 426/580 |
| 4,369,125 | 1/1983 | Kragen et al. | 426/573 |
| 4,571,338 | 2/1986 | Okonogi et al. | 426/324 |
| 4,647,470 | 3/1987 | Sanderson et al. | 426/573 |

FOREIGN PATENT DOCUMENTS

3425284A1 1/1985 Fed. Rep. of Germany .
2029251 10/1970 France .
2110517A 6/1983 United Kingdom .

OTHER PUBLICATIONS

FSTA 83-06, p. 0912, A. B. Kisselburgh, Bulletin, International Dairy Fed. No. 142, 50–51 (1982), Recombination of Milk and Creams.
Hall et al., Drying of Milk and Milk Products, Avi Publishing Co. Inc., 1966, p. 270.
FSTA 800 15848—G. deSouza, Inst. de Tecnologia de Alimentos, San Paulo, Brazil, 8 Ref. No. 60, 61–70, 1978 Preliminary Trials for Manufacture of a Life-Long Dessert.

Primary Examiner—Marianne Cintins
Assistant Examiner—Helen Pratt
Attorney, Agent, or Firm—Burns, Doane, Swecker & Mathis

[57] ABSTRACT

Essentially homogeneous and storage-stable liquid chocolate milk products, having viscosities ranging from 10 to 100 mPa.s, are formulated from milk bases including a suspension of cocoa particulates and a suspension stabilizing amount of a xanthan/galactomannan admixture adapted for the formation of an aqueous gel therefrom, wherein the ratio by weight of xanthan/galactomannan ranges from 80/20 to 20/80.

14 Claims, No Drawings

1

HOMOGENEOUS, STORAGE-STABLE CHOCOLATE MILK COMESTIBLES AND PROCESS OF MAKING

This application is a continuation of application Ser. No. 090,502, filed Aug. 28, 1987 now abandoned.

BACKGROUND OF THE INVENTION

1. Field of the Invention

The present invention relates to novel liquid chocolate milks having low viscosities and comprising stabilizing amounts of particular admixture of gums.

2. Description of the Prior Art

To formulate beverages of "chocolate milk" type, producers currently use carrageenans to facilitate the dispersion of cocoa particles therein. However, the suspension power of the carrageenans is quite weak, resulting in the formation of a dense deposit at the bottom of the container after a given period of storage. This deposit is commercially undesirable.

Xanthan gum, in view of its remarkable rheological properties, was a likely candidate to improve the suspending power of the carrageenans. It was discovered, however, that the incorporation of small amounts of xanthan gum in milk causes a destabilization of the caseins with consequent separation of the milk into two distinct liquid phases. This phenomenon occurs when xanthan gum is added either alone or admixed with carrageenans and numerous other gums.

Mixtures, or blends, of gums have already been proposed to this art for use in milk products. For example, U.S. Pat. No. 3,507,664 describes the combination of xanthan gum and carob gum in frozen milk compositions and U.S. Pat. No. 4,242,367 describes a combination of guar, xanthan, carrageenan and, optionally, carob gums to prevent the separation of whey in milk shakes. It is noted that in such applications mixtures of gums are used in amounts necessary either to gel the medium, or to thicken it appreciably. Typically, milk shakes have a viscosity of 135-215 mPa.s (Brookfield LVT, 60 rpm, #2 needle), which is undesirable for beverages of the "chocolate milk" type. Within this range of viscosity values, no phase separation is observed.

SUMMARY OF THE INVENTION

Accordingly, a major object of the present invention is the provision of improved low-viscosity liquid chocolate milks that are stable and may be stored for long periods of time without sedimentation of the cocoa particles therein.

Consistent herewith, it has now been discovered that certain mixtures of gums, when incorporated into the chocolate milks in minor amounts, make it possible to maintain the cocoa particles in suspension for an extended period of time, and without causing separation of the phases of the milk medium.

Briefly, the chocolate milk according to the present invention has a viscosity ranging from 10 to 100 mPa.s (Brookfield LVT, 30 rpm, #2 needle, 20° C.) and comprises from 0.01 to 0.1% by weight of a stabilizing admixture of xanthan gum and at least one galactomannan capable of forming, together with the xanthan, an aqueous gel having a concentration of at least 0.1%, and with the xanthan/galactomannan ratio by weight ranging from 80/20 to 20/80.

DETAILED DESCRIPTION OF THE PREFERRED EMBODIMENTS OF THE INVENTION

More particularly according to the present invention, a xanthan gum is a heteropolysaccharide having a molecular weight of several millions, produced by the fermentation of carbohydrates under the action of bacteria of the genus Xanthomonas and more particularly *Xanthomonas campestris*, or other species, as is very well known in this art.

Galactomannans are natural gums derived from seeds of the legume family. They include D-galactose and D-mannose units. Among the galactomannans which form, in an aqueous medium, continuous gels with xanthan gum in a concentration of at least 0.1%, carob gum, Tara gum and Cassia gum are especially representative.

All of these gums are readily commercially available in different grades, depending upon the production and processing techniques employed. Any foodgrade material is suitable for use according to the invention.

The total amount of gums included in the milk may range from 0.01% to 0.1% by weight, and preferably from 0.03 to 0.07% by weight. Amounts greater than 0.1% produce undesirably excessive thickening. The weight ratio between the xanthan gum and the galactomannan may range from 80/20 to 20/80, preferably from 40/60 to 60/40, and more preferably is about 50/50.

The chocolate milk is prepared by mixing the powders into the milk, followed by a preservation treatment, advantageously pasteurization or sterilization. It is preferable to disperse the gums in the milk and then add the cocoa powder thereto, in an amount typically ranging from 1.5% to 2% by weight, and optionally, sugar in an amount ranging from 6% to 8% by weight. The resulting suspension is subjected to a heat treatment at a temperature and for a period of time sufficient to assure pasteurization or sterilization. This treatment is typically carried out at a temperature of 80° to 150° C. for a duration of 2 seconds to several minutes, for example 15 minutes, depending on the method used. Preferably, the sterilization is carried out at a temperature equal to or higher than 120° C. for 2 to 10 seconds. The mixture is then cooled, while maintaining the liquid in motion, to a temperature at least lower than the gel point of the xanthan/galactomannan admixture. The gel point is defined as that temperature whereat a liquid solution of the mixture of gums is transformed into the solid state during cooling. It is a function, in particular, of the nature of each of the gums and their weight ratio, and most frequently ranges from 40° to 60° C. It is necessary to maintain the liquid in nonstatic state, at least to a point below the gelling temperature, in order to prevent the formation of gelled aggregates which would be detrimental to the stability of the suspension. The cooling may be carried out, for example, in a vessel equipped with agitating means, or in a heat exchanger of the tubular, plate, or other type, the flow of the liquid therein being sufficient to assure the necessary agitation. The product obtained may then be filled in bottles and again cooled, if necessary. By the process described above, a low viscosity, homogeneous and stable chocolate milk is produced that may be stored for more than one month without the formation of a solid deposit of cocoa particles (which latter would require vigorous agitation for re-homogenization at the point in time of ultimate use).

The milk may be supplied as whole milk, semi-skim milk or milk reconstituted from industrially available milk solids. The gums must be well hydrated to prevent the destabilization of the milk caseins. Optionally, a pre-heat treatment may be carried out to insure optimum hydration of the galactomannan.

In order to further illustrate the present invention and the advantages thereof, the following specific examples are given, it being understood that same are intended only as illustrative and in nowise limitative. In each of said examples to follow, there were used:

(1) a UHT (ultrahigh temperature sterilized) milk, semi-skim;

(2) RHODIGEL® xanthan gum marketed by RHONE-POULENC.

EXAMPLE 1

To demonstrate the specificity of the mixtures of gums according to the invention on the stability of the milk, samples were prepared by dispersing the gums in the milk and agitated for 15 min. Separation of liquid phases was observed after storage for 4 days at 4° C. in 100 ml graduated test tubes, after which the volume of the phases was constant. All of the binary mixtures were used in a weight ratio of 1/1, except as otherwise indicated. The results are reported in the Table I which follows:

TABLE I

|  | Weight % | Separation (Volume, in ml of upper phase) |
|---|---|---|
| Xanthan gum | 0.02 | 24 |
|  | 0.04 | 35 |
|  | 0.08 | 57 |
| Xanthan gum/carrageenan gum | 0.08 | 37 |
| Xanthan gum/pectin | 0.08 | 43 |
| Xanthan gum/Na alginate | 0.08 | 37 |
| Xanthan gum/CMC | 0.08 | 57 |
| Xanthan gum/H PMC | 0.08 | 61 |
| Xanthan gum/carob gum | 0.08 | none |
| Xanthan gum/Tara* | 0.05 | none |
| Xanthan gum/Cassia* | 0.05 | none |
| Xanthan/carob gum |  |  |
| 90/10* | 0.05 | 80 |
| 80/20* | 0.05 | slight lightening on surface |

*sterilization at 120° C., 7 sec.

EXAMPLE 2

A 50/50 mixture of xanthan and carob (locust bean gum FL 45-60, marketed by Hercules, Inc.) gums was dispersed in milk at different concentrations, under agitation at 700 rpm, at 23° C.

The agitation was maintained for 15 min. 7% sugar and 2% cocoa powder (BARRY cocoa—99.5% of particles less than 75 μm, pH 7.8±0.2, cocoa butter 10%) were added, while maintaining agitation for 5 min.

Sterilization was carried out at 120° C. for 7 sec, and the mixture cooled to 4° C. by circulation in a tubular heat exchanger and decanted into a 100 ml test tube.

The viscosity was measured (Brookfield LVT, 30 rpm, #2 needle, 20° C.) and the stability of the cocoa suspension was observed as a function of time by measuring the volume of the clear supernatant (absence of cocoa particles). The results are reported in the Table II which follows:

TABLE II

|  | % xanthan/carob 50/50 | | | | |
|---|---|---|---|---|---|
|  | 0.01 | 0.02 | 0.04 | 0.05 | 0.06 |
| Viscosity (mPa.s) |  | 10 | 30 | 35 | 40 |
| Stability (ml supernatant) |  |  |  |  |  |
| 1st day | 58 | 48 | 1 | 0 | 0 |
| 2nd day | 60 | 51 | 3 | 1 | 0 |
| 3rd day | 77 | 56 | 7 | 3 | 3 |
| 7th day |  | 65 | 10 | 7 | 8 |
| 14th day |  |  | 13 | 11 |  |
| 21st day |  |  | 20 |  | 16 |
| 28th day |  |  |  | 17 | 20 |

Good stability was observed after long preservation for a concentration higher than 0.02%. In all cases, slight agitation or decanting into a glass was sufficient for the chocolate milk to regain its homogeneous, smooth appearance. No separation of phases due to the exclusion of caseins occurred over the course of time. The viscosity values were similar to those of a commercial chocolate milk.

EXAMPLE 3

A chocolate milk was prepared in the manner indicated in Example 2, by varying the ratio and the concentration of the gums.

| Stability | XANTHAN/CAROB | | | | |
|---|---|---|---|---|---|
| (ml supernatant per 100 ml) | 80/20 0.02% | 60/40 0.05% | 50/50 0.05% | 40/60 0.05% | 20/80 0.1% |
| 1 day |  | 2 | 0 | 6 |  |
| 3 day |  | 5 | 3 | 15 |  |
| 7 day |  | 10 | 7 | 20 |  |
| 15 day | 80 | 20 | 11 | 35 | 63 |

EXAMPLE 4

A chocolate milk was prepared in the manner described in Example 2, by using 0.03% xanthan gum, 0.03% carob gum, 7% sugar and 2% cocoa powder. The sterilization temperature was 130° for 7 seconds.

| Duration (days) | 1 | 2 | 5 | 15 | 20 |
|---|---|---|---|---|---|
| Stability (ml of supernatant per 100 ml) | 0 | 0 | 0 | 2 | 3 |

EXAMPLE 5

A chocolate milk was prepared in the manner indicated in Example 2, by using 0.05% of a stabilizing mixture of 50/50 xanthan gum and Tara or Cassia gum.

| Duration (days) | 1 | 3 | 7 | 15 | 20 |
|---|---|---|---|---|---|
| Stability (ml of supernatant per 100 ml) |  |  |  |  |  |
| Xanthan/Tara | 1 | 6 | 20 | 25 | 37 |
| Xanthan/Cassia | 0 | 2 | 11 | 16 | 20 |

As in the preceding examples, a simple decantation was sufficient for the chocolate milk to attain a homogeneous appearance.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An essentially homogeneous and storage-stable liquid chocolate milk, having a viscosity ranging from 10 to 100 mPa.s, comprising a milk base including a suspension of cocoa particulates, and further comprising from 0.01 to less than 0.08% by weight of a suspension stabilizing amount of a xanthan/galactomannan admixture adapted for the formation of an aqueous gel therefrom, wherein the ratio by weight of xanthan/galactomannan ranges from 80/20 to 20/80.

2. The chocolate milk as defined by claim 1, said galactomannan comprising carob gum.

3. The chocolate milk as defined by claim 1, said galactomannan comprising Tara gum.

4. The chocolate milk as defined by claim 1, said galactomannan comprising Cassia gum.

5. The chocolate milk as defined by claim 1, comprising from 0.03 to 0.07% by weight of said xanthan/galactomannan admixture.

6. The chocolate milk as defined by claim 1, wherein the ratio by weight of xanthan/galactomannan ranges from 40/60 to 60/40.

7. The chocolate milk as defined by claim 1, wherein the ratio by weight of xanthan/galactomannan is about 50/50.

8. The chocolate milk as defined by claim 1, comprising from 1.5 to 2% by weight of said cocoa particulates.

9. The chocolate milk as defined by claim 1, further comprising from 6 to 8% by weight of sugar.

10. The chocolate milk as defined by claim 1, wherein said milk is pasteurized.

11. The chocolate milk as defined by claim 1, wherein said milk is sterilized.

12. A sealed container comprising the chocolate milk as defined by claim 1 confined therein, essentially devoid of sedimented solid deposits of said cocoa particulates.

13. The chocolate milk as defined by claim 1, comprising from 0.02 to 0.08% by weight of said xanthan/galactomannan admixture.

14. A process for the preparation of the essentially homogeneous and storage-stable liquid chocolate milk as defined by claim 1, comprising (i) dispersing 0.01 to 0.08% by weight of said xanthan/galactomannan admixture in the milk base, (ii) adding a cocoa powder thereto, (iii) heat treating the resulting suspension at a temperature and for a period of time sufficient to effect pasteurization or sterilization thereof, and (iv) controlledly cooling said suspension, while maintaining a nonstatic state thereof, to a temperature less than the gel point of the xanthan/galactomannan admixture.

* * * * *